(12) United States Patent
Tacy et al.

(10) Patent No.: US 12,470,605 B2
(45) Date of Patent: Nov. 11, 2025

(54) ENFORCEMENT OF OFFLINE AND REAL TIME DATA CAPTURE AND TRANSMISSION COMPLIANCE USING A GROUND TRUTH MAP (GTM)

(71) Applicant: Raytheon Company, Arlington, VA (US)

(72) Inventors: Matthew J. Tacy, Boston, MA (US); John A. Cogliandro, Dedham, MA (US)

(73) Assignee: Raytheon Company, Arlington, VA (US)

( * ) Notice: Subject to any disclaimer, the term of this patent is extended or adjusted under 35 U.S.C. 154(b) by 212 days.

(21) Appl. No.: 18/136,680

(22) Filed: Apr. 19, 2023

(65) Prior Publication Data

US 2024/0356987 A1 Oct. 24, 2024

(51) Int. Cl.
*H04L 9/40* (2022.01)
*G02B 27/01* (2006.01)
*G06F 3/01* (2006.01)
*G06T 7/73* (2017.01)
*H04N 7/18* (2006.01)
(Continued)

(52) U.S. Cl.
CPC .............. *H04L 63/30* (2013.01); *G06F 3/011* (2013.01); *G06T 7/74* (2017.01); *H04N 7/18* (2013.01); *H04N 21/23418* (2013.01); *H04N 23/61* (2023.01); *G02B 2027/0138* (2013.01); *G02B 2027/014* (2013.01); *G02B 27/017* (2013.01); *G06T 2207/10016* (2013.01); *G06T 2207/30244* (2013.01)

(58) Field of Classification Search
CPC .......... G02B 27/017; G02B 2027/0138; G02B 2027/014; G06F 3/011; G06T 2207/10016; G06T 2207/30244; H04L 63/30; H04N 7/18; H04N 21/23418; H04N 23/61
See application file for complete search history.

(56) References Cited

U.S. PATENT DOCUMENTS

| 4,992,883 A | 2/1991 | Tsunekawa |
| 5,594,469 A | 1/1997 | Freeman et al. |

(Continued)

FOREIGN PATENT DOCUMENTS

| AE | 6007 | 11/2023 |
| CA | 3076505 | 2/2024 |

(Continued)

OTHER PUBLICATIONS

"U.S. Appl. No. 17/507,073, Notice of Allowance mailed Mar. 22, 2023", 8 pgs.

(Continued)

*Primary Examiner* — Thomas J Dailey
(74) *Attorney, Agent, or Firm* — Schwegman Lundberg & Woessner, P.A.

(57) ABSTRACT

A Ground Truth Map (GTM) is defined, generated for a local scene and then used to enforce real-time data transmission compliance. Data, and specifically imagery of disallowed objects in the local scene, may pose a risk for "spillage" (e.g., accidental storage or transmission) at multiple points in the process. Techniques for defining the GTM, handling the session data used to generate the GTM and for using the GTM alone or in combination mitigate the risk of spillage.

18 Claims, 7 Drawing Sheets

(51) Int. Cl.
*H04N 21/234* (2011.01)
*H04N 23/61* (2023.01)

(56) References Cited

U.S. PATENT DOCUMENTS

| | | |
|---|---|---|
| 6,356,437 B1 | 3/2002 | Mitchell et al. |
| 6,970,183 B1 | 11/2005 | Monroe |
| 7,110,909 B2 | 9/2006 | Friedrich et al. |
| 7,126,558 B1 | 10/2006 | Dempski |
| 7,372,451 B2 | 5/2008 | Dempski |
| 7,596,240 B2 | 9/2009 | Ito et al. |
| 7,653,259 B2 | 1/2010 | Pilu |
| 8,432,559 B2 | 4/2013 | Kobayashi |
| 8,749,343 B2 | 6/2014 | Cirker |
| 9,179,105 B1 | 11/2015 | Zeira et al. |
| 9,313,391 B1 | 4/2016 | Zhang et al. |
| 9,582,709 B2 | 2/2017 | Wang et al. |
| 10,089,790 B2 | 10/2018 | Lawson et al. |
| 10,122,825 B1 | 11/2018 | Petty |
| 10,142,410 B2 | 11/2018 | Giffin et al. |
| 10,403,046 B2 | 9/2019 | Pinti et al. |
| 10,425,403 B2 | 9/2019 | Chen et al. |
| 10,440,348 B2 | 10/2019 | Koppal et al. |
| 10,531,137 B1 | 1/2020 | Matak et al. |
| 10,602,054 B2 | 3/2020 | Jung et al. |
| 10,674,972 B1 | 6/2020 | Piatrou et al. |
| 10,679,425 B2 | 6/2020 | Pinti et al. |
| 10,878,584 B2 | 12/2020 | Agata et al. |
| 11,696,011 B2 | 7/2023 | Tacy et al. |
| 11,700,448 B1 | 7/2023 | Cogliandro et al. |
| 11,792,499 B2 | 10/2023 | Mayorga et al. |
| 2004/0233282 A1 | 11/2004 | Stavely et al. |
| 2005/0018879 A1 | 1/2005 | Ito et al. |
| 2008/0030575 A1 | 2/2008 | Davies et al. |
| 2010/0002071 A1 | 1/2010 | Ahiska |
| 2011/0130949 A1 | 6/2011 | Arrasvuori |
| 2011/0142369 A1 | 6/2011 | Aila et al. |
| 2011/0181716 A1 | 7/2011 | Mcleod et al. |
| 2012/0033098 A1 | 2/2012 | Matsuyama |
| 2012/0074296 A1 | 3/2012 | Hammes et al. |
| 2012/0087546 A1 | 4/2012 | Focke et al. |
| 2012/0120309 A1 | 5/2012 | Utagawa |
| 2012/0203487 A1 | 8/2012 | Johnson et al. |
| 2013/0278778 A1 | 10/2013 | Kagei |
| 2014/0168084 A1 | 6/2014 | Burr |
| 2014/0211856 A1 | 7/2014 | Finn et al. |
| 2015/0186728 A1 | 7/2015 | Kimura |
| 2015/0208042 A1 | 7/2015 | Jia et al. |
| 2015/0302647 A1 | 10/2015 | Osterhout et al. |
| 2016/0026253 A1 | 1/2016 | Bradski et al. |
| 2016/0080642 A1 | 3/2016 | Jung et al. |
| 2016/0080652 A1 | 3/2016 | Shirota et al. |
| 2016/0133054 A1 | 5/2016 | Honjo et al. |
| 2016/0273908 A1 | 9/2016 | Rose et al. |
| 2016/0335524 A1 | 11/2016 | Bremer et al. |
| 2016/0349228 A1 | 12/2016 | Kester et al. |
| 2016/0378939 A1 | 12/2016 | Baumberger et al. |
| 2017/0193279 A1 | 7/2017 | Kusens et al. |
| 2017/0213079 A1 | 7/2017 | Herger et al. |
| 2017/0273549 A1 | 9/2017 | Nazareth et al. |
| 2017/0323062 A1 | 11/2017 | Djajadiningrat et al. |
| 2017/0339295 A1 | 11/2017 | Honda |
| 2018/0043225 A1 | 2/2018 | Lau et al. |
| 2018/0092698 A1 | 4/2018 | Chopra et al. |
| 2018/0259673 A1 | 9/2018 | Cui et al. |
| 2018/0309808 A1 | 10/2018 | Andon et al. |
| 2018/0330096 A1 | 11/2018 | Breindel et al. |
| 2018/0330110 A1 | 11/2018 | Nelson et al. |
| 2018/0336737 A1 | 11/2018 | Varady et al. |
| 2018/0341812 A1 | 11/2018 | Floor et al. |
| 2019/0066403 A1 | 2/2019 | Nagura et al. |
| 2019/0088026 A1 | 3/2019 | Isaacson et al. |
| 2019/0122378 A1 | 4/2019 | Aswin |
| 2019/0122437 A1 | 4/2019 | Pinti et al. |
| 2019/0188930 A1 | 6/2019 | Tsukahara |
| 2019/0272677 A1 | 9/2019 | Pinti et al. |
| 2019/0279019 A1 | 9/2019 | Choi et al. |
| 2019/0335115 A1 | 10/2019 | Kumai |
| 2020/0082631 A1 | 3/2020 | Yoon et al. |
| 2020/0143643 A1 | 5/2020 | Kusens et al. |
| 2020/0174261 A1 | 6/2020 | Uenohara et al. |
| 2020/0210726 A1 | 7/2020 | Yang et al. |
| 2020/0211348 A1* | 7/2020 | Wang ............... H04N 23/61 |
| 2020/0334919 A1 | 10/2020 | Bowen |
| 2020/0394430 A1 | 12/2020 | Ahmed et al. |
| 2021/0070311 A1 | 3/2021 | Patychuk et al. |
| 2021/0224885 A1 | 7/2021 | Yarra et al. |
| 2021/0243233 A1* | 8/2021 | Singh ............... H04L 63/0435 |
| 2021/0342998 A1 | 11/2021 | Li et al. |
| 2022/0070453 A1 | 3/2022 | Tang et al. |
| 2023/0064328 A1* | 3/2023 | Pitts ............... G06V 40/20 |
| 2023/0128616 A1 | 4/2023 | Mayorga et al. |
| 2023/0131642 A1* | 4/2023 | Tacy ............... H04N 23/60 |
| | | 348/158 |
| 2023/0177717 A1 | 6/2023 | Tank et al. |
| 2023/0262316 A1 | 8/2023 | Cogliandro et al. |
| 2024/0355580 A1* | 10/2024 | Yim ............... G06T 7/12 |

FOREIGN PATENT DOCUMENTS

| | | |
|---|---|---|
| CN | 102244807 | 11/2011 |
| CN | 106228544 A | 12/2016 |
| CN | 113168676 | 7/2021 |
| CN | 114419720 | 4/2022 |
| EP | 3599607 | 1/2020 |
| EP | 3920007 | 7/2023 |
| JP | 2000032473 | 1/2000 |
| JP | 2000092473 A | 3/2000 |
| JP | 2000228741 A | 8/2000 |
| JP | 2004179971 | 6/2004 |
| JP | 2005057743 | 3/2005 |
| JP | 2006025250 A | 1/2006 |
| JP | 2006293605 A | 10/2006 |
| JP | 2009147647 | 7/2009 |
| JP | 2011097238 A | 5/2011 |
| JP | 2015126352 A | 7/2015 |
| JP | 2016167688 A | 9/2016 |
| JP | 2017108263 A | 6/2017 |
| JP | 2017118168 | 6/2017 |
| JP | 2017528947 | 9/2017 |
| JP | 2017529635 A | 10/2017 |
| JP | 2017533484 | 11/2017 |
| JP | 2019165431 | 9/2019 |
| JP | 2020537230 | 12/2020 |
| JP | 2021118499 A | 8/2021 |
| JP | 7258084 B2 | 4/2023 |
| KR | 102123248 | 6/2020 |
| KR | 102662027 | 4/2024 |
| TW | 202318855 A | 5/2023 |
| TW | 202318856 A | 5/2023 |
| TW | 202343371 | 11/2023 |
| TW | 202444108 | 11/2024 |
| TW | 202444109 | 11/2024 |
| WO | WO-2010094065 A1 | 8/2010 |
| WO | WO-2015170409 A1 | 11/2015 |
| WO | 2016208102 | 12/2016 |
| WO | WO-2017027338 A1 | 2/2017 |
| WO | WO-2017177019 A1 | 10/2017 |
| WO | WO-2017204081 A1 | 11/2017 |
| WO | 2018043225 | 3/2018 |
| WO | 2020065301 | 4/2020 |
| WO | WO-2023069511 | 4/2023 |
| WO | WO-2023069527 | 4/2023 |
| WO | 2023212040 | 11/2023 |
| WO | 2024215895 | 10/2024 |
| WO | 2024220303 | 10/2024 |

OTHER PUBLICATIONS

"U.S. Appl. No. 17/507,073, Notice of Allowance mailed Dec. 22, 2022", 10 pgs.

"U.S. Appl. No. 17/507,073, Supplemental Notice of Allowability mailed Jan. 5, 2023", 2 pgs.

(56) References Cited

OTHER PUBLICATIONS

"U.S. Appl. No. 17/507,111, Non Final Office Action mailed Nov. 25, 2022", 20 pgs.
"U.S. Appl. No. 17/507,111, Notice of Allowance mailed Apr. 7, 2023", 8 pgs.
"U.S. Appl. No. 17/507,111, Response filed Jan. 23, 2023 to Non Final Office Action mailed Nov. 25, 2022", 16 pgs.
"U.S. Appl. No. 17/733,456, Ex Parte Quayle Action mailed Apr. 7, 2023", 9 pgs.
"U.S. Appl. No. 17/733,456, Notice of Allowance mailed May 10, 2023", 9 pgs.
"U.S. Appl. No. 17/733,456, Response filed Apr. 21, 2023 to Ex Parte Quayle Action mailed Apr. 7, 2023", 10 pgs.
"Canadian Application Serial No. 3076505, Examiners Rule 86(2) Report mailed May 5, 2023", 3 pgs.
"Canadian Application Serial No. 3076505, Office Action mailed Dec. 16, 2022", 5 pgs.
"Canadian Application Serial No. 3076505, Response Filed Dec. 20, 2022 to Office Action mailed Dec. 16, 2022", 7 pgs.
"Canadian Application Serial No. 3076505, Response Filed May 10, 2023 to Examiners Rule 86(2) Report mailed May 5, 2023", 21 pgs.
"Canadian Application Serial No. 3076505, Voluntary Amendment filed Apr. 28, 2020", 11 pgs.
"Canadian Application Serial No. 3076505, Voluntary Amendment Filed Dec. 21, 2022", 12 pgs.
"European Application Serial No. 18789290.6, Communication Pursuant to Article 94(3) EPC mailed Jan. 20, 2021", 7 pgs.
"European Application Serial No. 18789290.6, Response filed May 7, 2021 to Communication Pursuant to Article 94(3) EPC mailed Jan. 20, 2021", 21 pgs.
"European Application Serial No. 21188467.1, Extended European Search Report mailed Nov. 2, 2021", 9 pgs.
"European Application Serial No. 21188467.1, Response filed Jan. 7, 2022 to Extended European Search Report mailed Nov. 2, 2021", 16 pgs.
"Horizon Overview and Deployment Planning—VMware Horizon 2212", VMware, Inc., (2023), 84 pgs.
"International Application Serial No. PCT/US2018/052626, Written Opinion mailed Dec. 7, 2018", 9 pgs.
"International Application Serial No. PCT/US2018/052626, International Preliminary Report on Patentability mailed Apr. 21, 2020", 10 pgs.
"International Application Serial No. PCT/US2018/052626, International Search Report mailed Dec. 7, 2018", 4 pgs.
"International Application Serial No. PCT/US2022/047126, International Search Report mailed Mar. 24, 2023", 6 pgs.
"International Application Serial No. PCT/US2022/047126, Invitation to Pay Additional Fees mailed Feb. 1, 2023", 12 pgs.
"International Application Serial No. PCT/US2022/047126, Written Opinion mailed Mar. 24, 2023", 10 pgs.
"International Application Serial No. PCT/US2022/047144, International Search Report mailed Mar. 23, 2023", 6 pgs.
"International Application Serial No. PCT/US2022/047144, Invitation to Pay Additional Fees mailed Jan. 31, 2023", 15 pgs.
"International Application Serial No. PCT/US2022/047144, Written Opinion mailed Mar. 23, 2023", 13 pgs.
"Japanese Application Serial No. 2021-112687, Notification of Reasons for Refusal mailed Aug. 2, 2022", w/ English Translation, 6 pgs.
"Japanese Application Serial No. 2021-112687, Response filed Oct. 31, 2022 to Notification of Reasons for Refusal mailed Aug. 2, 2022", with English translation of claims, 10 pgs.
"Korean Application Serial No. 10-2020-7007808, Notice of Preliminary Rejection mailed Nov. 30, 2021", w/ English translation, 5 pgs.
"Korean Application Serial No. 10-2020-7007808, Response filed Jan. 25, 2022 to Notice of Preliminary Rejection mailed Nov. 30, 2021", with machine translation, 24 pgs.
"Korean Application Serial No. 10-2020-7007808, Voluntary Amendment filed May 21, 2020", with English translation of claims, 29 pgs.
"Kuwait Application Serial No. KW/P/2020/138, Office Action mailed Dec. 27, 2022", 5 pgs.
"Kuwaiti Application Serial No. KW/P/2020/138, Response Filed Feb. 9, 2023 to Office Action mailed Dec. 27, 2022", W/ English Claims, 4 pgs.
"Saudi Arabian Application Serial No. 520411721, Office Action mailed Mar. 28, 2023", W/English Translation, 11 pgs.
"Taiwanese Application Serial No. 111136376, Office Action mailed Apr. 26, 2023", with machine translation, 21 pgs.
"XMReality 4.4 Manual, XMReality Remote Guidance, "Like Being There" XMReality AB", XMReality AB, (2015), 49 pages.
Henderson, Steven, et al., "Augmented Reality for Maintenance and Repair (ARMAR)", Air Force Research Laboratory Human Effectiveness Directorate Warfighter Readiness Research Division Logistics Readiness Branch Wright-Patterson AFB OH 45433-7604, (Aug. 2007), 70 pages.
Henderson, Steven, et al., "Evaluating the Benefits of Augmented Reality for Task Localization in Maintenance of an Armored Personnel Carrier Turret", IEEE International Symposium on Mixed and Augmented Reality 2009 Science and Technology Proceedings, (Oct. 2009), 10 pgs.
Molineros, Jose, et al., "Computer vision for guiding manual assembly", Proceedings of the 2001 IEEE International Symposium on Assembly and Task Planning, (May 2001), 7 pages.
Reiners, Dirk, et al., "Augmented Reality for Construction Tasks: Doorlock Assembly", IWAR, (Nov. 1998), 10 pgs.
Smith, Randall, et al., "Estimating Uncertain Spatial Relationships in Robotics", Machine Intelligence and Pattern Recognition 1, (Jan. 1986), 435-461.
Tang, Arthur, et al., "Comparative Effectiveness of Augmented Reality in Object Assembly", Paper: New Techniques for Presenting Instructions and Transcripts CHI 2003: New Horizons, (Apr. 2003), 8 pages.
Vollmer, Michael, et al., "High speed and slow motion: the technology of modern high speed cameras", Physics Education, Institute of Physics Publishing, Bristol, GB, vol. 46, No. 2, (Mar. 3, 2011), 191-202.
"International Application Serial No. PCT US2024 024084, International Search Report mailed Aug. 22, 2024", 5 pgs.
"International Application Serial No. PCT US2024 024084, Written Opinion mailed Aug. 22, 2024", 7 pgs.
"International Application Serial No. PCT US2024 024086, International Search Report mailed Aug. 22, 2024", 4 pgs.
"International Application Serial No. PCT US2024 024086, Written Opinion mailed Aug. 22, 2024", 6 pgs.
"International Application Serial No. PCT US2023 019962, International Preliminary Report on Patentability mailed Nov. 7, 2024", 10 pgs.
"U.S. Appl. No. 18/134,852, Non Final Office Action mailed Nov. 7, 2024", 14 pgs.
"Taiwanese Application Serial No. 112113919, Office Action mailed Oct. 25, 2024", With English Machine Translation, 49 pgs.
"European Application Serial No. 22806066.1, Response filed Nov. 7, 2024 to Response to Communication pursuant to Rules 161(1) and 162 EPC", 20 pgs.
"International Application Serial No. PCT US2022 047126, International Preliminary Report on Patentability mailed May 2, 2024", 12 pgs.
"International Application Serial No. PCT US2022 047144, International Preliminary Report on Patentability mailed May 2, 2024", 15 pgs.
"European Application Serial No. 22809569.1, Response filed Nov. 13, 2024 to Communication pursuant to Rules 161(1) and 162 EPC mailed May 28, 2024", 58 pgs.
"U.S. Appl. No. 18/134,852, Response filed Jan. 9, 2025 to Non Final Office Action mailed Nov. 7, 2024", 10 pgs.
"Taiwanese Application Serial No. 112113919, Response filed Dec. 24, 2024 to Office Action mailed Oct. 25, 2024", w current English claims, 43 pgs.

(56) References Cited

OTHER PUBLICATIONS

"Taiwanese Application Serial No. 111136376, Office Action mailed Nov. 27, 2023", With English Machine Translation, 27 pgs.

"Taiwanese Application Serial No. 111136376, Response filed Feb. 1, 2024 to Office Action malled Nov. 27, 2023", With English Machine Translation, 18 pgs.

"Taiwanese Application Serial No. 111136376, Response Filed Jan. 17, 2024 to Office Action mailed Dec. 15, 2023", With English Machine Translation, 18 pgs.

"U.S. Appl. No. 17/507,073, Notice of Allowance mailed Jun. 27, 2023", 9 pgs.

"International Application Serial No. PCT US2023 019962, International Search Report mailed Jul. 20, 2023", 3 pgs.

"International Application Serial No. PCT US2023 019962, Written Opinion mailed Jul. 20, 2023", 8 pgs.

"Taiwanese Application Serial No. 111136376, Response Filed Jul. 25, 2023 to Office Action mailed Apr. 26, 2023", With English machine translation, No Claim Amendments, 26 pages.

"Taiwanese Application Serial No. 113113258, Office Action mailed Jan. 9, 2025", With English Machine Translation, 27 pgs.

"Taiwanese Application Serial No. 113113257, Office Action mailed Jan. 8, 2025", W English Translation, 11 pgs.

"Japanese Application Serial No. 2024-523576, Notification of Reasons for Refusal mailed Feb. 12, 2025", With English Machine Translation, 14 pgs.

"U.S. Appl. No. 18/134,852, Notice of Allowance mailed Feb. 26, 2025", 9 pgs.

"Japanese Application Serial No. 2024-523577, Notification of Reasons for Refusal mailed Mar. 11, 2025", With English Machine Translation, 6 pgs.

"Taiwanese Application Serial No. 113113257, Response filed Mar. 6, 2025 to Office Action mailed Jan. 8, 2025", W English Claims, 95 pgs.

"U.S. Appl. No. 18/134,852, Supplemental Notice of Allowability mailed Mar. 26, 2025", 2 pgs.

"Taiwanese Application Serial No. 113113258, Response filed Mar. 24, 2025 to Office Action mailed Jan. 9, 2025", With English Machine Translation, 99 pgs.

\* cited by examiner

ENFORCEMENT OF OFFLINE AND REAL TIME DATA CAPTURE AND TRANSMISSION COMPLIANCE USING A GROUND TRUTH MAP (GTM)

BACKGROUND

Field

This disclosure relates to the capture and processing of video to enforce data capture and transmission compliance related to the definition, generation and use of ground truth map (GTM) in real or near real-time private, restrictive or secure environments.

Description of the Related Art

Video camera technology is increasingly ubiquitous in the world today. Devices such as head-mounted cameras, robotically controlled cameras, semi-autonomous or autonomous robots, cellular telephones, desktop or table computers, near-eye displays and hand-held game systems, for example, may include cameras and associated software to enable video capture, display and transmission. These devices are being used to provide unidirectional or bi-directional video communication in real or near real time. Privacy and security concerns exists when, intentionally or unintentionally, video that should not be captured, stored, displayed or transmitted is. These privacy and security issues are sometimes called "data spills". A person's, company's or country's privacy may be violated, possibly illegally. In certain restrictive environments, such as military or company proprietary or secure environments, strict controls exist governing what visual information may be captured, stored, displayed or transmitted (particularly across country boundaries).

In an effort to restrict unwanted video capture or transmission, some existing systems monitor the video as it is captured. These systems use human processing, computer vision (CV), artificial intelligence (AI), computational algorithms, or a combination thereof to identify problematic visual information (e.g. a person's face or a company's proprietary information) and then either remove or obscure the information from the video file data. These systems may even shut off the recording device to prevent further capture of problematic information. However, the existing systems described all capture, store, and process the problematic information. Because the problematic data is stored (albeit sometimes only temporarily) and processed, data spill risks, such as those related to cyber incursions or theft, still exist, and therefore these systems cannot meet requirements for certain secure or restrictive environments. The processing required to remove or obscure the information from the video file makes these systems incompatible with applications that require real or near real time video capture and transmission.

Video capture that enforces data capture and transmission compliance in real or near real-time may be needed in a variety of applications for individual users, companies or countries. Such applications may include but are not limited to inspection/process review, supplier quality management, internal audits, troubleshooting of equipment or systems, factory operations, factory collaboration, validation and verification, repair and upgrades of equipment, training on equipment or systems, or medical procedures. In these applications, it may be necessary to capture and uni-directionally or bi-directionally transmit video of a local scene that includes problematic information in real or near real time to facilitate efficient and effective remote communication. As a special case, data capture and transmission compliance may be implemented in an Augmented Reality environment.

Augmented Reality (AR) refers to the generation of two or three dimensional (3D) video graphics or other media such that they are overlaid on and registered with surrounding objects in the environment. Man-made "markers" aka "sources" having a unique and easily identifiable signature may be placed on the user, on the object or in the scene and used for various purposes. These markers have been used to identify and locate specific objects, to trigger the display of computer generated media or to determine the position and pose of the user.

In certain video or AR environments such as a remote repair or inspection, a concern, primarily of the customer and which is heightened by the video camera industry push to maximize the FOV, is that the user of the video being captured and transmitted or viewed locally (either the field technician or expert, but primarily the field technician), may turn away from the object of interest, intentionally or unintentionally, and capture video of another portion of the scene that should not be captured or transmitted. Some level of data capture and transmission compliance may be required by customer demands, industry regulations, national security or country specific laws to avoid unintentional or intentional broad FOV transmission. Current techniques include physically draping with a cloth or tarp the areas around the object of interest to prevent capture in the video signal, mechanically narrowing the FOV, or sequestering the video prior to transmission and having a security-cleared domain expert review and edit the video signal post-capture. These are often impractical and time consuming activities. Even more common, and more costly is the removal of the equipment in question to a specialized secure space, such as an empty garage or hanger so that there are no extraneous items in the scene. In many cases removing equipment, physical draping or post-capture editing are either not sufficient to satisfy the compliance requirements or are impractical and costly to implement in a quasi real-time interactive situation. In some situations there are country laws that would prevent any type of post-capture editing for national security and ITAR—International Traffic and Arms Regulations reasons.

U.S. Pat. Nos. 10,403,046 and 10,679,425 entitled "Field of View (FOV) and Key Code Limited Augmented Reality to Enforce Data Capture and Transmission Compliance" disclosed enforcement of an alignment condition between the video camera's pointing direction and a marker in the scene to avoid capture of excluded data in a real-time interactive situation. This may be done, for example, by determining whether the video camera pointing direction satisfies an alignment condition to a marker in the local scene such that the video camera FOV lies within a user-defined allowable FOV about the marker. A separate sensor may be used to detect the presence of the marker within a sensor FOV to satisfy the alignment condition. The camera or sensor FOV may be reduced to create a buffer zone to provide additional assurance that the camera FOV does not stray outside the allowable FOV. If the alignment condition is not satisfied, the video camera is controlled to exclude at least a portion of the camera FOV that lies outside a user-defined allowable FOV from capture within the video signal. For example, this could be done by turning the video camera off or by narrowing its FOV. Markers may also be used as a fail safe to ensure imagery in a particularly sensitive area of the scene is neither captured nor transmitted. If the separate sensor detects these markers, the video camera is shut down. The system may cue the user e.g., "green" means the alignment condition is satisfied, "yellow" means the technician's eyes or camera are beginning to wander and "red" means the alignment condition is violated and the camera is disabled. In this system, the use of a separate sensor to enforce the alignment condition and to detect other markers in sensitive areas is specifically designed for more rigorous environments, in which compliance requires that portions of the scene or tagged objects cannot be captured (detected) by the video camera itself, much less output into the video signal and for environments in which real or quasi real-time interaction is required.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure defines a Ground Truth MAP (GTM), generates a specific GTM for a local scene and then uses that GTM to enforce real-time data transmission compliance. Data, and specifically imagery of disallowed objects in the local scene, may pose a risk for "spillage" (e.g., accidental storage or transmission) at multiple points in the process. The present disclosure defines techniques for defining the GTM, handling the session data used to generate the GTM and for using the GTM to mitigate the risk of spillage.

In a ground truth map (GTM) generation mode, a sensor capture images of the local scene and stores them as session data in session memory. The session data is processed to generate a GTM of the local scene including one or more identified objects. The GTM includes position or feature data of the identified objects. In a firewall mode, the GTM is placed outside the session memory and all session data in the session memory is wiped. The method transitions to a video capture and transmission mode, in which an EUD video camera captures a sequence of images within a camera field-of-view (CFOV) in a pointing direction in the local scene to form a video signal. Prior to forming the video signal, the GTM is used to determine whether the CFOV will include disallowed or allowed objects. If a disallowed object will be included in the CFOV, the video camera is controlled (e.g., turned off, frames blanks or obscured, the CFOV narrowed or selected pixels if the disallowed object blurred in real-time) to prevent inclusion of the disallowed object in the video signal. If no disallowed objects will be included in the CFOV, the video signal is formed and transmitted.

In different embodiments, one or more of the various tasks of image capture and GTM generation and processing may be distributed between the EUD, another local device (e.g., a desktop or laptop computer) and a secondary sensor. In one configuration, the EUD is used to capture all of the imagery and to generate and process the GTM to enforce compliance. In another configuration, a local device, fed by imagery from either the EUD or a secondary sensor, generates the GTM. In another configuration, the local device accesses the GTM to enforce transmission compliance of real-time image capture and sends an interrupt to the EUD to enable/disable the video camera or sequence of images to prevent inclusion of the disallowed object in the video signal. Alternately, the EUD could access the GTM to enforce transmission compliance.

In different embodiments, the GTM may constitute session data that is stored in session memory and must be moved prior to wiping the session memory or may not constitute session data and is directly stored outside session memory. Wiping all session data from session memory should be an automated process that ensures that all session data is in fact erased. This may be achieved by defining a process on the device's native operating system (OS) that can be initiated by a simple button push "Wipe Session" or the like or possibly an additional button push "Confirm". Alternately, a non-persistent virtual machine (NPVM) may be configured on the native OS for the purpose of generating the GTM. In this case, to enter GTM generation mode the NPVM is started and initializes session memory. Once the GTM is placed outside session memory, the NPVN is shutdown automatically wiping all session data. Wiping of the session data is required before transitioning to use of the GTM during live capture and transmission.

In different embodiments, the GTM is defined to include no imagery of the local scene and may be defined such that all objects are blind e.g., no identifier. In one configuration, the GTM includes a library of allowed/disallowed objects that are characterized by a number of features and feature values. In another configuration, the GTM is a map of allowed/disallowed objects that includes position information in addition to or in lieu of the feature data. The position information may constitute the location of an allowed or disallowed object in the GTM or local scene. Alternately, the position information may, for a particular camera FOV, constitute the pose (position and pointing direction) from which the camera would capture the allowed/disallowed object. Should the GTM so configured spill, the risk of exposing imagery of disallowed objects has been mitigated.

As described, session data must be wiped before transitioning to live capture and transmission. This can be enforced by inhibiting live capture and transmission until a confirmation that session data has been wiped is received. Confirmation may be required to activate one or more of the following: the EUD video camera, a switch to allow captured images to be transmitted, processing of the GTM and captured images or access to the GTM such as via an encryption key. This provides the host of the local scene or the operator responsible for data transmission compliance with assurance that imagery that was captured and processed to generate the GTM has been erased prior to moving forward.

In different embodiments, the GTM is used to determine whether the EUD video camera's FOV will include an allowed or disallowed object. In an alignment condition embodiment, the GTM is used to determine whether the video camera pointing direction satisfies an alignment condition to a specified allowed object. In a time-delay embodiment, the images are time-delayed prior to forming the video signal to provide time to recognize disallowed objects in the GTM. In a predicted FOV embodiment, motion of the camera is used to compute a predicted FOV in the GTM to recognize disallowed objects. In addition, the GTM can used to determine if a violation of the alignment condition or capturing a disallowed object is imminent and issue a cue to the user to take corrective action to avoid or mitigate the violation.

These and other features and advantages of the disclosure will be apparent to those skilled in the art from the following detailed description of preferred embodiments, taken together with the accompanying drawings, in which:

DETAILED DESCRIPTION

Figure 1:
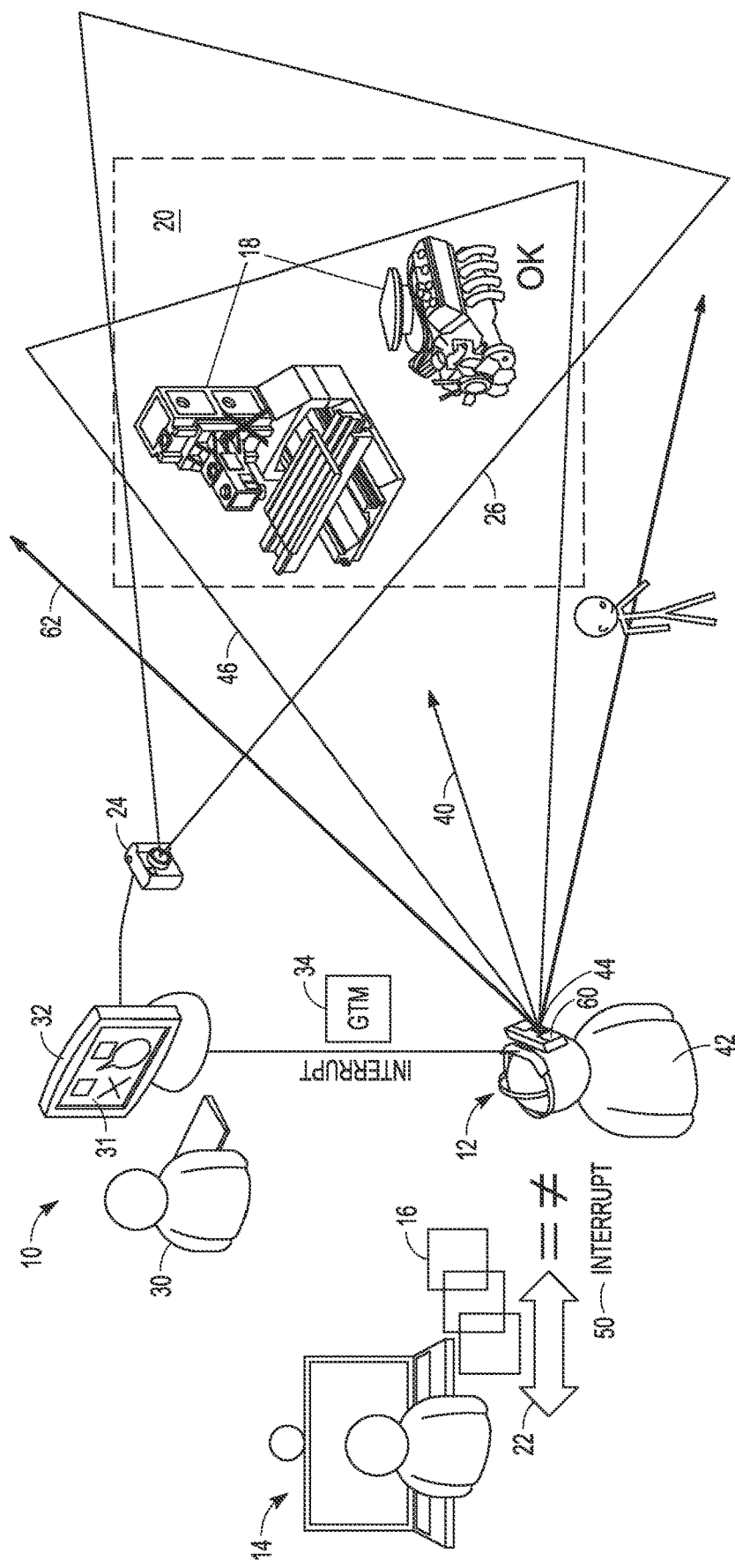
FIG. 1 is an illustration of a system in which a ground truth map (GTM) including allowed and disallowed objects is defined, generated and used to enforce data capture and transmission compliance of real and near real time video.
Figure 2:
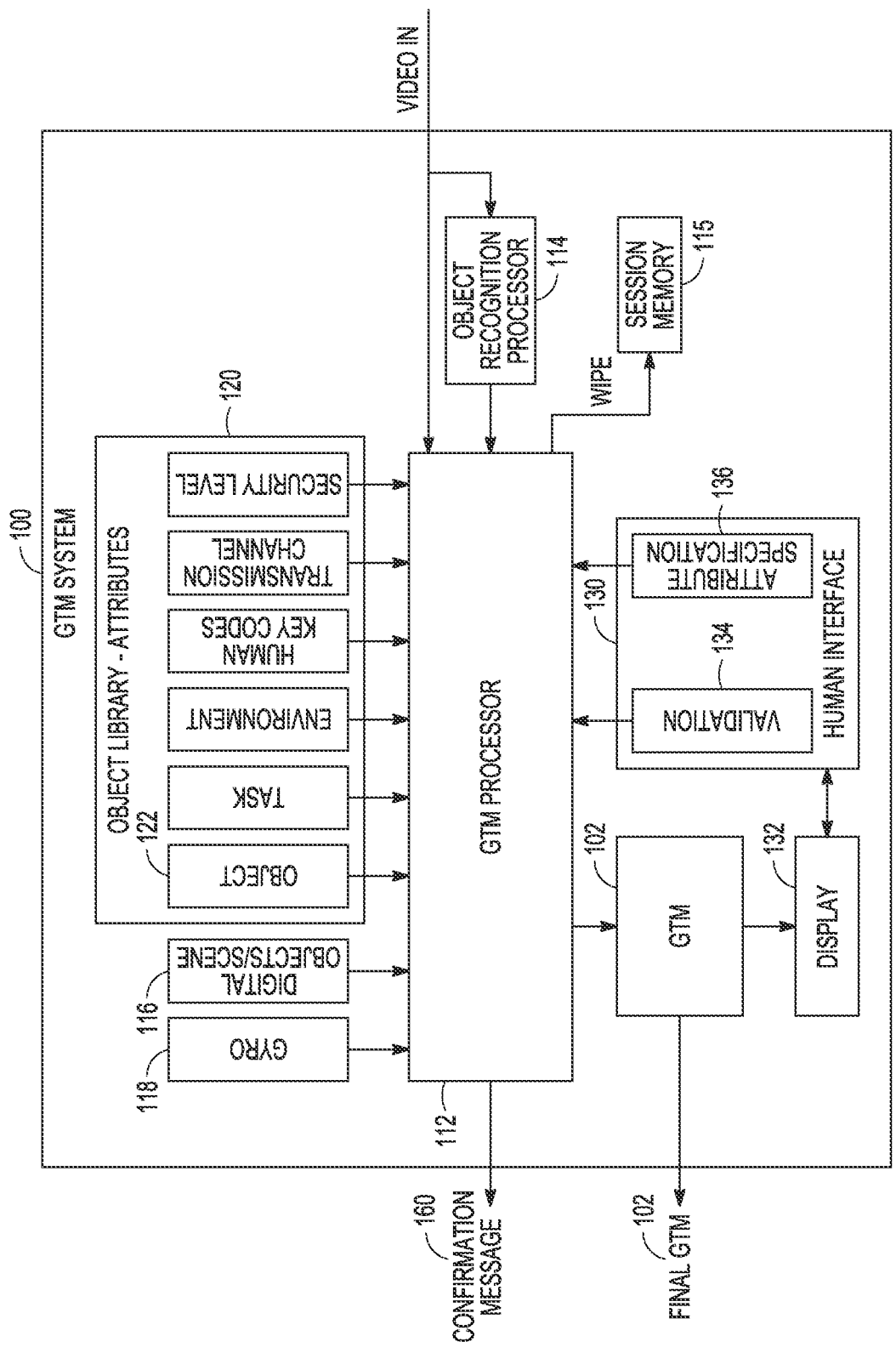
FIG. 2 is a block diagram of a system to define and generate a GTM and to erase all session data upon transfer of the final GTM.

Video capture that enforces data capture and transmission compliance in real or near real-time may be needed in a variety of applications for individual users, companies or countries. Such applications may include but are not limited to inspection/process review, supplier quality management, internal audits, troubleshooting of equipment or systems, factory operations, factory collaboration, validation and verification, repair and upgrades of equipment, training on equipment or systems. In these applications, it may be necessary to capture and uni-directionally or bi-directionally transmit video of a local scene that includes problematic information in real or near real time to facilitate efficient and effective communication. As a special case, data capture and transmission compliance may be implemented in an Augmented Reality (AR) environment. The video camera pointing direction is slaved or controlled by user motion (e.g., a head mounted video camera or hand-held video camera), a user-controlled manual manipulator (e.g. a robotic arm) or a fully automated manual manipulator (e.g. an AI controlled robotic arm or semi-autonomous or autonomous robot) all referred to herein as an "End User Device (EUD)".

The present disclosure is directed to these and other similar applications in which some level of data capture and transmission compliance may be required by customer demands, industry regulations, national security or country specific laws. In certain instances, compliance may require that portions of a scene or specifically tagged objects cannot be included within the video signal output by the video camera for display or transmission. In other more rigorous environments, compliance may require that portions of the scene or tagged objects cannot be stored in the camera's memory chip, much less output into the video signal. The memory chip may be only a memory chip or may be a video display or video transmission chip that includes the permanent memory. The required level of compliance may be determined by a number of different factors and may change between or even during capture and display or transmission of the video signal.

The present disclosure defines a Ground Truth MAP (GTM), generates a specific GTM for a local scene and then uses that GTM to enforce real-time data transmission compliance. The generation and use of the GTM can be centralized in the EUD or distributed among the EUD, another local device (e.g., a desktop or laptop computer) and an additional sensor.

Data, and specifically imagery of disallowed objects in the local scene, may pose a risk for "spillage" (e.g., accidental transmission) at multiple points in the process. First, the definition or construction of the GTM could include raw imagery or specific identification of disallowed objects, which if spilled could constitute a violation. In certain embodiments, the GTM is constructed in a manner that does not include raw imagery of any disallowed object, and further that any disallowed objects are blind. The GTM may include a list of objects in the local scene, whether allowed or disallowed and a characterizing feature set. Alternately, the GTM may include a list of objects in the local scene, whether allowed or disallowed, and characterizing position information (e.g., coordinates in the local scene/GTM or pose information (coordinates and pointing direction of a video camera from which the object is captured)). Second, raw imagery or "session data" captured or created during the generation of the GTM, which if spilled could constitute a violation. For example, a hybrid computer/human method may be used to process video of the local scene to form the GTM. An interactive human interface may be used to specify one or more attributes including but not limited to object, task, environment, humans in the loop, transmission channel or security level. Computer-implemented processes may be used to identify and classify as allowed or disallowed objects in the local scene based on attributes of the video session. A human interface may be available to validate either the object identification or classification. In certain embodiments, once the GTM is generated for the local scene and a particular application, steps are taken to wipe the raw imagery or "session data" that was gathered and processed to form the GTM from memory and to confirm the erasure. Third, during live video capture and transmission imagery of disallowed objects could be captured and transmitted resulting in a violation. In certain embodiments, the GTM is used to prevent inclusion of disallowed objects in the transmitted video signal. This can be accomplished by using the GTM to enforce an alignment condition to a specified allowed object, implementing an internal time-delay prior to formation or transmission of the video signal, or to compare a predicted FOV against the GTM or a combination thereof.

Using the pose and motion of the EUD video camera, cues can be derived from the GTM and used to prompt a correction in the video camera pointing direction to prevent capture of a disallowed object before it occurs or to enforce the alignment condition before it is lost. If the cues fail to cause corrective action, the video camera is then controlled to prevent capture of the disallowed objects or to punish loss of the alignment condition. As a result, disallowed objects do not make it into the video signal and thus do not reach downstream circuitry, processing or a network to which the video camera may be connected. This can be implemented in real or near real time or slower if the application does not demand such performance with a delay line or temporary memory chip positioned between the video camera's ROIC and memory chip. For example, the slowest acceptable video frame rate for most users is approximately 24 frames/sec (fps), or approximately 42 milliseconds (ms). A time-delay of less than 42 ms would be a generally acceptable to most users. A typical video camera is 60 fps or about 16 ms. A fast video camera is 120 fps or about 8 ms., which represents a refresh rate approximately 5 times faster than acceptable human video viewing. At these frame rates, a delay of a single frame is certainly real time. More specifically, for fps of 24, 60 and 120 delays of one, three or six frames, respectively, would constitute real-time. Some applications may relax this standard.

Without loss of generality, the disclosure will now be described in the context of an AR system in which a technician with a wearable AR device or "EUD" is performing some task on an object within a local scene. Video of the object and local scene is captured and transmitted to a remote client who views the video and may provide guidance, instructions, data etc. back to the technician which are then overlaid on the video. It is understood that the disclosure can be used in any application in which video is captured and transmitted to enforce compliance. The system includes the EUD, a desktop and an additional sensor. As described, the definition, generation and use of the GTM may be distributed amongst the hardware components or centralized in the EUD and forego the additional desktop and sensor.

Referring now to FIG. 1, in an embodiment an AR environment includes a Ground Truth Map (GTM) system 10, an EUD 12 and a remote client 14 (e.g., a person at a computer workstation with a camera) that enforce capture and transmission compliance of real-time and near real-time video 16 of objects 18 in a local scene 20 over a transmission channel 22 to remote client 14. As depicted, the GTM system 10 and EUD 12 are separate systems. In other embodiments, the GTM system 10 can be incorporated into the EUD 12, which may use a common video camera or dedicated cameras/sensors.

GTM system 10 includes a sensor 24 (e.g., a video camera, a 3D camera, LIDAR, Sonar) configured to capture a sensed signal in a sensor FOV 26, which can be scanned, manually or automatically, to form an image of the local scene 20 that provides an initial GTM. A technician 30 uses an interactive human interface 31 on a computer 32 to provide log-in credentials and other attributes of a video session. A computer-implemented object recognition algorithm processes the image to identify the objects 18 as for example milling machine #1234 and engine #4321, which become part of the GTM 28. Computer-generated models may be linked to the objects as part of the GTM. The models may include or be linked to specific attributes. A computer-implemented object classification algorithm processes the objects and the attributes of the video session to classify each object as allowed "OK" or disallowed "X" to form an intermediate GTM. The objects are preferably stored without any raw imagery of the object. Furthermore, the objects may be stored "blind" e.g., without a specific identifier such as the specific milling machine or engine. Rather they may be stored with a more generic identifier of a milling machine or engine, an object O1 with certain features and feature values without any identifier or simply as object O1 as allowed or disallowed. The objects may be stored as a library without any positional information or may be stored with positional information. The positional information may be coordinates in the GTM or local scene or a pose (position and pointing direction) from which the object can be seen and captured by the EUD.

What constitutes allowed or disallowed objects may depend on many different attributes, which may be broken into attribute classes such as related to the object, task being performed during a video session, environmental, human, transmission channel, motion and security level. An object class may have specific attributes for the object identification, different classes to which the object might belong, different systems for which the object might be part of, different sub-systems that might be part of the object, object shape, object size, material composition and so forth. The task class may specify a pre-defined task such as inspection, repair, maintenance, replacement etc. or may be a description of the task. Task may also include a distance attribute whereby any object that is identified as having a distance from the video camera that is either too close (<min distance) or too far (>max distance) may be designated as disallowed. The environmental class may include the country and specific site in which the local scene exists and the video is captured or the country and specific site to which the video is transmitted. The human class may include functions or authorization levels of the technicians that capture the video and perform the task, a supervisor with override authority or the remote client. The transmission channel class may include the one or more communication channels or networks through which the video must pass to reach the remote client. The motion class may have attributes that the rate of motion (e.g., velocity and acceleration) of the video camera or an object that enters the local scene may be defined as an object and disallowed if the rate of motion exceeds a maximum value. Depending upon the nature of the application there can be many different specific attributes in each of these enumerated classes as well as other types of attribute classes.

The attributes are suitably stored in a library of objects. The specific instances of the attributes are defined at least in part through the interactive human interface via the initial log-in or specified attributes for a given session. Other attributes may be provided through other means such as the computer-generated models linked to specific objects, auto-detection of the country of origin and site, etc. For example, for a given video session a technician may provide his log-in key codes that define his authorization/access levels, specify a particular task to be performed on a specified object, specify the country and specific site of origin and the country and specific site of destination, a remote client key code, and an overall security level. The computer-implemented classification process maps these instances of the attributes against the library to initially determine whether each object in the local scene is allowed or disallowed.

This classification process can be performed in various ways. In one approach, the library is a multi-dimensional database in which each attribute is associated with a dimension of the database. The database stores either an allowed or disallowed value for the various permutations of the attributes. The classification algorithm simply identifies the corresponding value in the database. In another approach, each attribute is treated independently and is stored as allowed or disallowed. The classification algorithm may simply take the union of the attributes and if any are disallowed then the object is disallowed. Alternately, the algorithm could give precedence to certain attributes to overrule other attributes or look for patterns within the attributes. In a different approach, the attributes are stored as descriptors of some type in which the classification algorithm implements artificial intelligence (AI) to process the different combinations or permutations of the attributes to decide whether an object is allowed or disallowed.

The interactive human interface displays the intermediate GTM and indicia of allowed and disallowed objects on computer 32 and prompts technician 30 to confirm or override the objects identifications or the allowed and disallowed object classifications to output a final GTM 34. In many applications, regardless of the sophistication or maturity of the computer-implemented processes to first identify and then classify the objects as allowed or disallowed, it is still assumed that the judgement of the human technician (or supervisor) is superior to and more trusted than that of the computer. In many of these applications, the GTM cannot be released until the human technician has validated (or corrected) the GTM. The final GTM 34 is passed to the EUD 12 via a hard connection (e.g., cable) or a soft connection (e.g., wireless). Alternately, the computer 32 may process the GTM during live video capture and transmission by the EUD and send an interrupt to the EUD to enforce transmission compliance. A hardware of software firewall is provided inside the computer 32 or EUD 12 to ensure that neither raw imagery of disallowed objects is contained in GTM, imagery of or session data relating to disallowed objects processed to generate the GTM is retained or that imagery of disallowed objects gets transmitted during live capture and transmission.

The EUD 12 such as a pair of video goggles or a hand-held unit (e.g. a tablet or cell phone) has a pointing direction 40 that is slaved to technician motion (e.g., where a technician 42 is looking or pointing the unit). EUD 12 includes a video camera 44 (e.g., a 2D or 3D CMOS, CCD or SWIR camera) configured to capture light within a camera FOV (CFOV) 46 about pointing direction 40 to form the video signal 16 of a portion of local scene 20. If the GTM system is integrated as part of the EUD 12, vocal commands or hand gestures could be used to interact with the interface to provide attributes of the video session and to confirm or override object identifications or classifications to generate the GTM. AR can be used to facilitate definition and generation of the GTM.

In this example, field technician 42, which may or may not be the same person as technician 30, may be moving around inside a manufacturing facility to confirm the existence and location of certain objects, repair or maintain certain objects or to use certain objects. These objects may be considered to be "allowed" objects. The technician may even be prompted or cued to maintain the pointing direction 40 on a specified object to perform a certain task (e.g., verification, repair, use). The field technician 42 can capture, display and transmit "allowed" objects. The field technician 42 cannot capture and transmit, "disallowed" objects.

The EUD 12 cannot be activated to capture and transmit the video signal 16 until a current and final GTM 34 for the video session is received from GTM system 10 and verified by the EUD via, for example, a time stamp and session code. Furthermore, the EUD should receive a confirmation message from the GTM system that all session data including imagery of the local scene and specifically imagery of disallowed objects has been wiped or erased from the system. In other words, a technician cannot just turn the EUD 12 to start taking and transmitting the video signal. The GTM system and EUD force a video session to be defined (e.g., the attributes) and the computer and technician to generate and validate the final GTM, send the final GTM to the EUD, wipe the session data and send a confirmation of that erasure. The set-up time for this process does cause a "pause" between the initial definition of the video session and initiating the video session to capture and transmit compliant video in real or near real time.

In the firewall mode, wiping all session data from session memory should be an automated process that ensures that all session data is in fact erased. This may be achieved by defining a process on the device's native operating system (OS) that can be initiated by a simple button push "Wipe Session" or the like or possibly an additional button push "Confirm". Alternately, a non-persistent virtual machine (NPVM) also referred to as a non-persistent virtual desktop may be configured on the native OS for the purpose of generating the GTM. A NPVM is a virtual computer interface that is comprised of a master image detailing the desktop environment including software, applications, user roles and privileges, etc. When a user closes a session in a non-persistent virtual machine (e.g., logs out, shuts down, restarts, etc.), the virtual machine is returned to its initial state (that of the master image), and none of the user's session data from the session is stored. In this case, to enter GTM generation mode the NPVM is started and initializes session memory. Once the GTM is placed outside session memory, the NPVN is shutdown automatically wiping all session data. Wiping of the session data is required before transitioning to use of the GTM during live capture and transmission.

Prior to forming the video signal 16, the EUD 12 uses the final GTM 34 to determine whether CFOV 46 will include disallowed or allowed objects. If a disallowed object will be included or an alignment condition to an allowed object is not satisfied, the EUD's video camera 44 is controlled (e.g., turned off, CFOV narrowed, pixels blurred pre-capture, frames blanked, etc.) to prevent inclusion of the disallowed object in video signal 16 or to enforce the alignment condition. If not, the video signal 16 is formed and transmitted over transmission channel 22 to the remote client 14. To make this determination, the EUD 12 may measure a pose (location and orientation) of the video camera. The pose may be used to compute the current or a predicted camera FOV (map FOV) that is compared against the final GTM 34 to determine whether a disallowed object is or will be included in the camera FOV or whether the camera pointing direction satisfies an alignment condition to an allowed object. Alternately, the pose itself can be compared directly to the final GTM 34 to determine whether that pose has been pre-calculated to capture allowed or disallowed objects.

Generally speaking, if a disallowed object is detected in the map FOV or an alignment condition to a specified allowed object in the map FOV is not satisfied, the EUD 12 issues an interrupt 50 to control the video camera 44 to interrupt and stop images from being captured or transmitted. For example, if the pointing direction 40 satisfies an alignment condition (e.g., pointing direction within a few degrees of a preferred line-of-sight (LOS)) to allowed object 18 to perform some task and do not include any disallowed objects 18, the images captured by the video camera are transferred to memory where they are formed into the video signal that may be displayed to the field technician or transmitted to the remote client 14 (e.g., storage or display to other remote users).

If both conditions are satisfied, the device may generate a positive cue (e.g., green "good") to reinforce the technician's focus on the allowed object. If the technician's pointing direction starts to wander away from an allowed object or towards a disallowed object but has not yet violated either condition, the device may generate a prompt cue (e.g., yellow "move left") to take corrective action. If the technician's pointing direction has changed to the point that either the alignment condition is violated or capture of a disallowed object is imminent, the device may both control the video camera to prevent capture of disallowed objects and their inclusion in the video signal or deactivate the camera and issue an interrupt cue (e.g., red "Deactivate Video Camera").

If either condition is violated, the device issues an "interrupt" 50 that controls the camera to prevent capture of the video signal including disallowed objects or when the alignment condition is not satisfied. For a violation of the alignment condition, the EUD video camera is typically turned off either by interrupting power to the video camera, deactivating the electrochemical top layer of the detector array or ROIC or by pointing the video camera in a completely different direction. For a violation of capturing a disallowed object, in addition to these options, the video camera may be controlled to optically narrow the camera FOV or to selectively blur portions of the camera FOV (e.g., changing the f/#), changing lighting of the local scene to cause blinding of the sensor, blanking frames or selectively turn off or blur pixels on the detector array corresponding to the disallowed object.

EUD 12 is suitably fitted with a motion sensor 60 that is configured to sense the motion of any object 62 before the object enters the video camera's CFOV 46 (e.g., the motion sensor FOV 66 includes and extends beyond CFOV 46). The moving object might be an identified and classified object in the final GTM or an unidentified object that has moved into the local scene. The EUD treats any moving object whose motion exceeds a specified threshold as a disallowed and controls the video camera 44 to prevent inclusion of the moving object in the video signal. In an embodiment, the video capture and transmission mode may be temporarily suspended until the computer-implemented process can identify and classify the object and the interactive human interface used to confirm or override the identification or classification before returning to the video capture and transmission mode.

The same method can be applied to a remotely user-controlled robotic arm that points the video camera or a fully autonomous robot that uses a video camera as part of its vision system. In the case of the robotic arm, "time-delay" can ensure that protected data is not captured and transmitted to remote site, where the technician is located or elsewhere. In the case of a fully autonomous robot, "time-delay" can ensure that protected data is not captured and used by the robot or transmitted elsewhere.

The method can be applied to applications and local scenes in which only allowed objects are present (e.g., enforcing an alignment condition to a specified allowed object) or only disallowed objects are present (e.g., preventing capture and transmission of a disallowed object).

Referring now to FIGS. 2 and 3A-3C in an embodiment similar to the one depicted in FIG. 1, a GTM system 100 receives video in 104 from either the EUD or additional sensor and defines, generates and validates a final GTM 102 of a local scene for a particular video session. As described, the GTM system 100 may be implemented in the EUD or another device such as a desktop computer. Final GTM 102 may be processed by the EUD or the other device to enforce transmission compliance. The GTM system 100 is suitably configured to run on a non-persistent virtual machine (NPVM) on the EUD or other device.

GTM system 100 includes an object recognition processor 114 that processes the video in to identify objects in GTM 102. The raw video and any other data generating during the process of creating the GTM is stored in session memory 115. The GTM 102 may in some instances constitute session data that is stored in session memory 115 or it may be placed in other memory (e.g., outside the NPVM). The objects may be linked to computer-generated models of the objects provided by digital objects/scene 116, which may also be used to provide a digital version of the captured imagery or a partial digital scene to fill in gaps in the sensed signals. An optional gyro 118 provides the GTM processor with positional and orientation data to form the GTM 102 and position objects within the GTM.

An object library 120 includes attributes for a data base of known objects that together determine whether an object is allowed or disallowed for a given video session as defined by particular instances of a subset of those attributes. As previously described, the library may include object classes 122 possibly including but not limited to the object itself, task, environment, human key codes, transmit channel and security level. An object class 120 may have several attributes.

An interactive human interface 130 is presented to the technician on a display 132. Interface 130 is configured to prompt and receive from a technician a validation 134 (confirmation or override) of the identification of each object. Interface 130 is configured to prompt and receive from a technician attribute specification 136 to define a particular video session (this may be done before or after validation of the object IDs). GTM processor 112 executes a classification algorithm to map the specified attributes against the library of attributes to classify each object as allowed or disallowed to form an intermediate GTM. Interface 130 then prompts the technician to validate 134 (confirm or override) the classifications of each object (the validation of the IDs and classifications may be done concurrently) to output final GTM 102.

In certain configurations, the human interface 130 may provide the technician (or supervisor) with the ability to adjust or "throttle" the classification thresholds for object identification or classification. For example, if the object recognition processor 114 is misidentifying too many objects, the technician may increase the threshold. Conversely, if the processor is leaving too many objects as unidentified, the technician may decrease the threshold. The classification algorithm may be biased to initially classify objects as disallowed unless the attributes clearly indicate the object is allowable. If the processor is mis-classifying too many objects as disallowed, the technician may reduce the classification threshold or bias.

Figure 3:
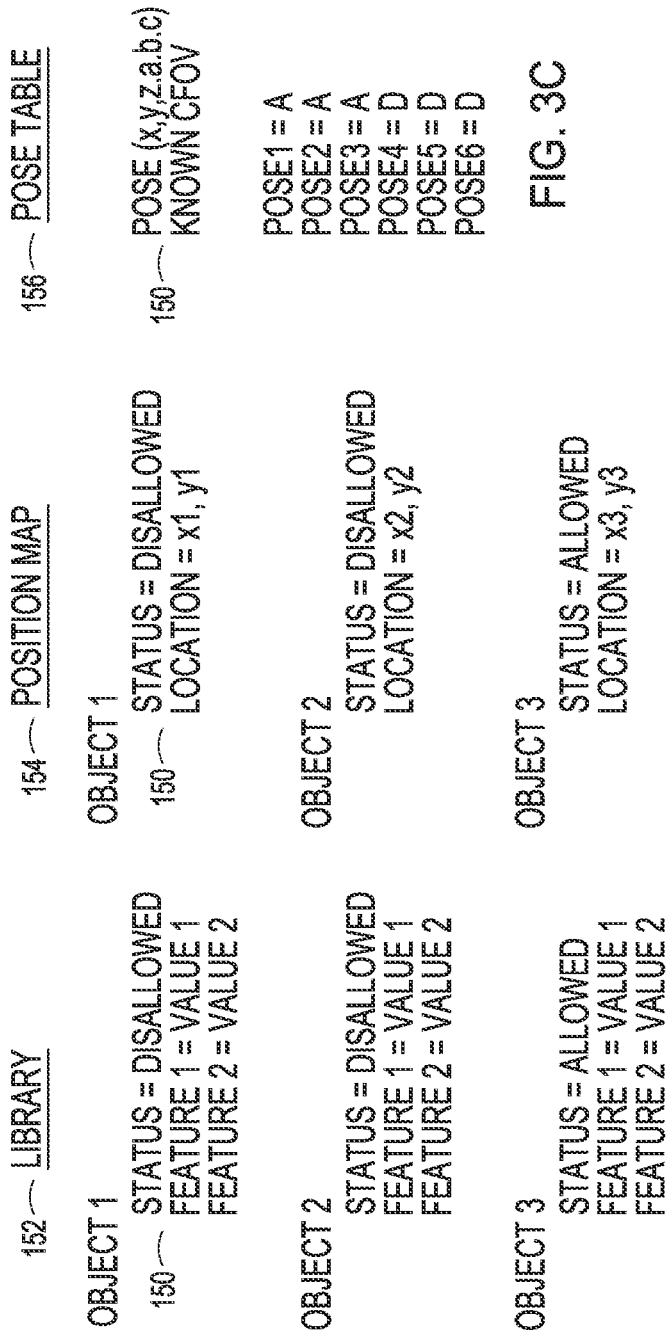
FIGS. 3A, 3B and 3C illustrate different embodiments of a GTM in which objects are defined by allowed/disallowed status and either feature data in a library, a position map or a pose table.

The final GTM 102 preferably includes no raw imagery of the local scene, and specifically no raw imagery of disallowed objects in the local scene. Furthermore, any objects and specifically disallowed objects may be blind e.g., no specific identifier of the object being included in the GTM. Rather objects may be characterized by feature or positional data only. As shown in FIG. 3A, GTM 102 includes a library 150 of objects detected in the local scene. Each object has a generic identifier, status as allowed or disallowed and is characterized by a number of features with feature values. As shown in FIG. 3B, GTM 102 includes a map 152 of objects detected in the local scene. Each object has a generic identifier, status as allowed or disallowed, and is characterized by a location in the GTM or local scene. For example, the generic identifier may be object1, machine1, milling machine1 but would not identify the specific milling machine by name or type, provided it is disallowed. As shown in FIG. 3C, GTM 102 includes a table 154 of poses (position and pointing direction of the EUD) and whether any object or an allowed/disallowed object will be captured from that pose. Spillage of any of the GTMs would pose minimal risk.

Once the final GTM 102 is validated and output, the session data including at least any imagery of the local scene and particularly imagery of any disallowed objects is wiped from session memory 115 and a confirmation message 160 is generated. This can be done by simply shutting down the NPVM after the final GTM 102 has been moved out of session memory or placed elsewhere. Confirmation message 160 may be a separate message or the provision of the final GTM 102 itself could serve as the confirmation message 160.

Figure 4:
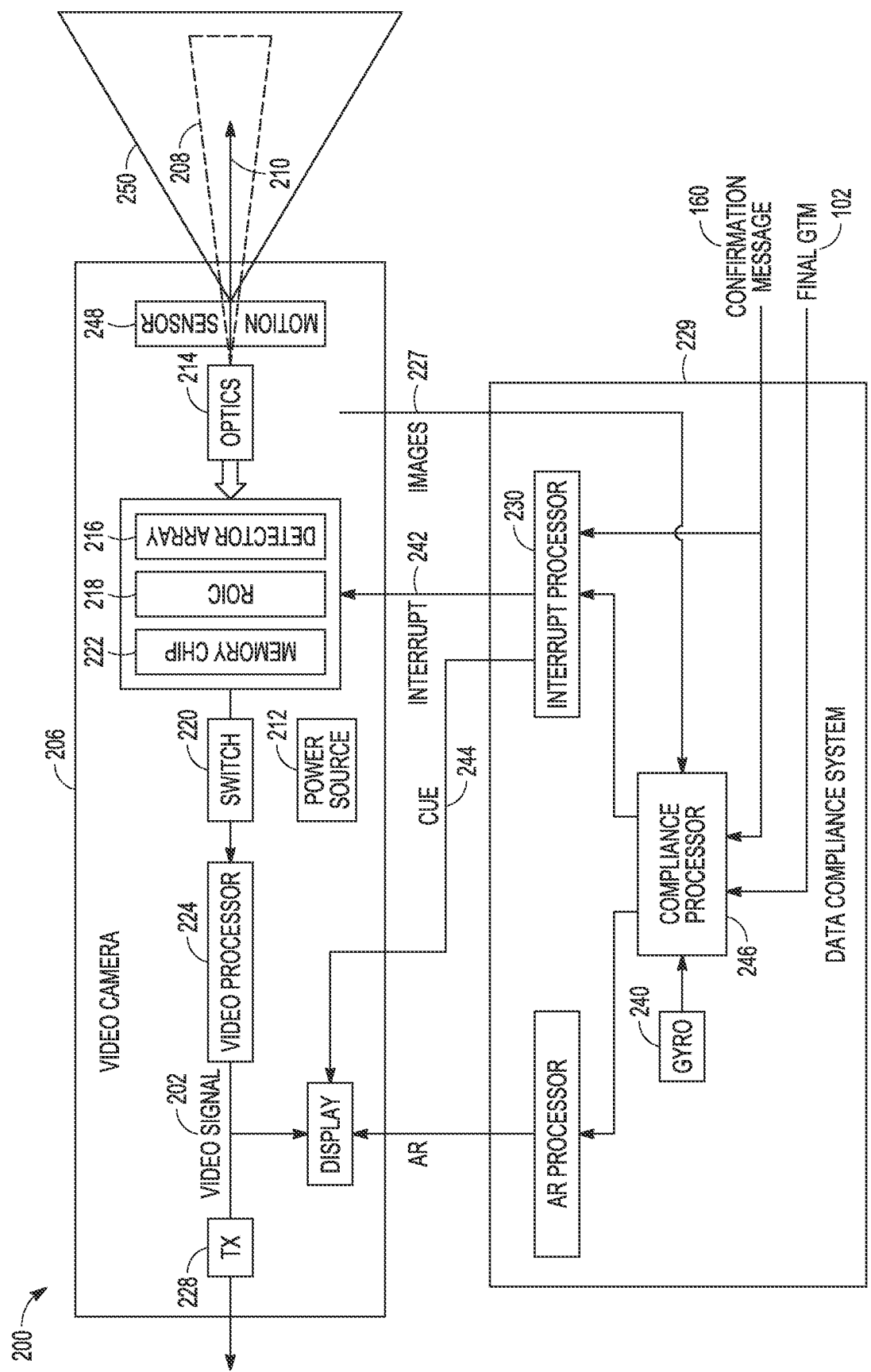
FIG. 4 is a block diagram of a system to enforce real-time transmission compliance on captured video.

Referring now to FIG. 4, in an embodiment, the final GTM 102 is used to enforce data transmission compliance for imagery captured and transmitted by an EUD 200 in the local scene.

EUD 200 is coupled to a "platform" such as a user, robotic arm, robot etc. that controls the pointing direction of the device. EUD 200 includes a video camera 206 that captures light within a camera field-of-view (CFOV) 208 in pointing direction 210 in the local scene. The video camera suitably includes a power source 212, optics 214 to collect light within the CFOV, a detector array 216 to sense and integrate light to form an image converting photons to electrons, a read out integrated circuit (ROIC) 218, which includes an amplifier and an A/D converter, to read out a sequence of images at a frame rate, and a memory chip 222 to store the sequence of images and pass them via a switch 220 to a video processor 224 to form the video signal 202 for a display 226 or transmission via a transmitter 228.

A data compliance system 229 receives images 227 from the EUD, the final GTM 102 and confirmation message 160 and issues interrupts 242 and cues 244 to enforce transmission compliance. Data compliance system 229 may be implemented in the EUD or another device such as a desktop computer.

The EUD 200 cannot be activated to capture and transmit the video signal 202 until a current and final GTM 102 for the video session is received from GTM system 200 and verified by the EUD via, for example, a time stamp and session code and the confirmation message 160 is received. In other words, a technician cannot just turn the EUD 100 on to start taking and transmitting the video signal. The GTM system and EUD force a video session to be defined (e.g., the attributes) and the computer and technician to generate and validate the final GTM, send the final GTM to the EUD, wipe the session data and send a confirmation to the EUD. The set-up time for this process does cause a "pause" between the initial definition of the video session and initiating the video session to capture and transmit compliant video in real or near real time.

An interrupt processor 230 controls video camera 206 to prevent disallowed objects from being captured in the video signal or to enforce an alignment condition to a specified allowed object. Prior to receiving and verifying the final GTM 102 or receiving confirmation message 160, the interrupt processor 230 issues an interrupt 242 that prevents the video camera from capturing and transmitting any video. The interrupt may control power source 212 to turn off the camera, may control switch 220 to blank or obscure a number of frames, it may obscure disallowed objects in a number of frames or it may stop images 227 from being stored in memory chip 222, Prior to formation of video signal 202, a compliance processor 246 accesses the final GTM 102 to determine whether each image 227 (e.g., the CFOV that captured each image) includes allowed or disallowed objects. If a disallowed object will be included in the CFOV, compliance processor 246 directs the interrupt processor 230 to issue interrupt 242 to control the video camera or sequence of images to prevent inclusion of the disallowed object in the video signal 202.

In certain configurations, compliance processor 246 will need to know at least a current pose of the EUD's video camera and possibly the motion (e.g., velocity and acceleration) of the video camera to process the images 227 against the final GTM 102. A gyro 240 can provide both the current pose and motion information. The current pose allows the compliance processor 246 to compute a current camera FOV that can be compared against the final GTM 102 to determine either if the current pointing direction satisfies an alignment condition to a specified allowed object or if that camera FOV includes a disallowed object. The current pose may be compared directly to the final GTM if the map is as configured in FIG. 3C. The current pose and motion information allows the compliance processor to compute a predicted FOV and compare it against the final GTM 102 to determine whether the video camera will, if not corrected, capture a disallowed object. The same information can be used to compute a predicted pose that could be compared against the final GTM if as configured in FIG. 3C.

Interrupt processor 230 may generate a cue 244 to change the video camera pointing direction to prevent capture of disallowed objects and their inclusion in the one or more future frames of the video signal without having to control or turn-off the video camera. Cue 244 is configured to preempt movement of the video camera towards the disallowed object before it occurs. For example, if the alignment condition is met a "green" cue may be displayed, if the alignment starts to wander a "yellow" cue is displayed and if the alignment fails a "red" cue is displayed. After generating the cue, the compliance processor updates its assessment. If the cue fails to prevent capture of the disallowed object, then the interrupt processor 230 issues the interrupt 242 to control the video to prevent capture of the disallowed object and its inclusion in the video signal.

If the video camera is trained on allowed object 234 and away from disallowed objects, the interrupt processor 230 determines whether the camera's pointing direction satisfies an alignment condition to one of the allowed objects. If not, the system generates a cue 244 to change the video camera pointing direction to enforce the alignment condition. If the cue fails to enforce the alignment condition, the video camera is deactivated. Loss of the alignment condition does not necessarily mean that the camera is going to capture a disallowed object. However, if the video camera wanders off of the allowed object and the cue fails to correct the problem, turning off the video camera, at least temporarily, is effective to train the platform to maintain the proper alignment to the allowed object to perform the task at hand. The length of time the video camera is turned off can vary in order to more effectively train the local or remote user or robot.

EUD 200 is suitably fitted with a motion sensor 248 that is configured to sense the motion of any object before the object enters the video camera's CFOV 208 (e.g., the motion sensor FOV 250 includes and extends beyond CFOV 208). The moving object might be an identified and classified object in the final GTM 102 or an unidentified object that has moved into the local scene. The EUD treats any moving object as a disallowed and controls the video camera 206 to prevent inclusion of the moving object in the video signal. In an embodiment, the video capture and transmission mode may be temporarily suspended until the computer-implemented process can identify and classify the object and the interactive human interface used to confirm or override the identification or classification before returning to the video capture and transmission mode.

As previously mentioned, to prevent the capture and transmission of excluded data in real or near real-time, various techniques including alignment condition, time-delay, predicted FOV or a combination thereof can be used to determine the presence of allowed or disallowed objects in the map FOV in a timely manner.

Figure 5:
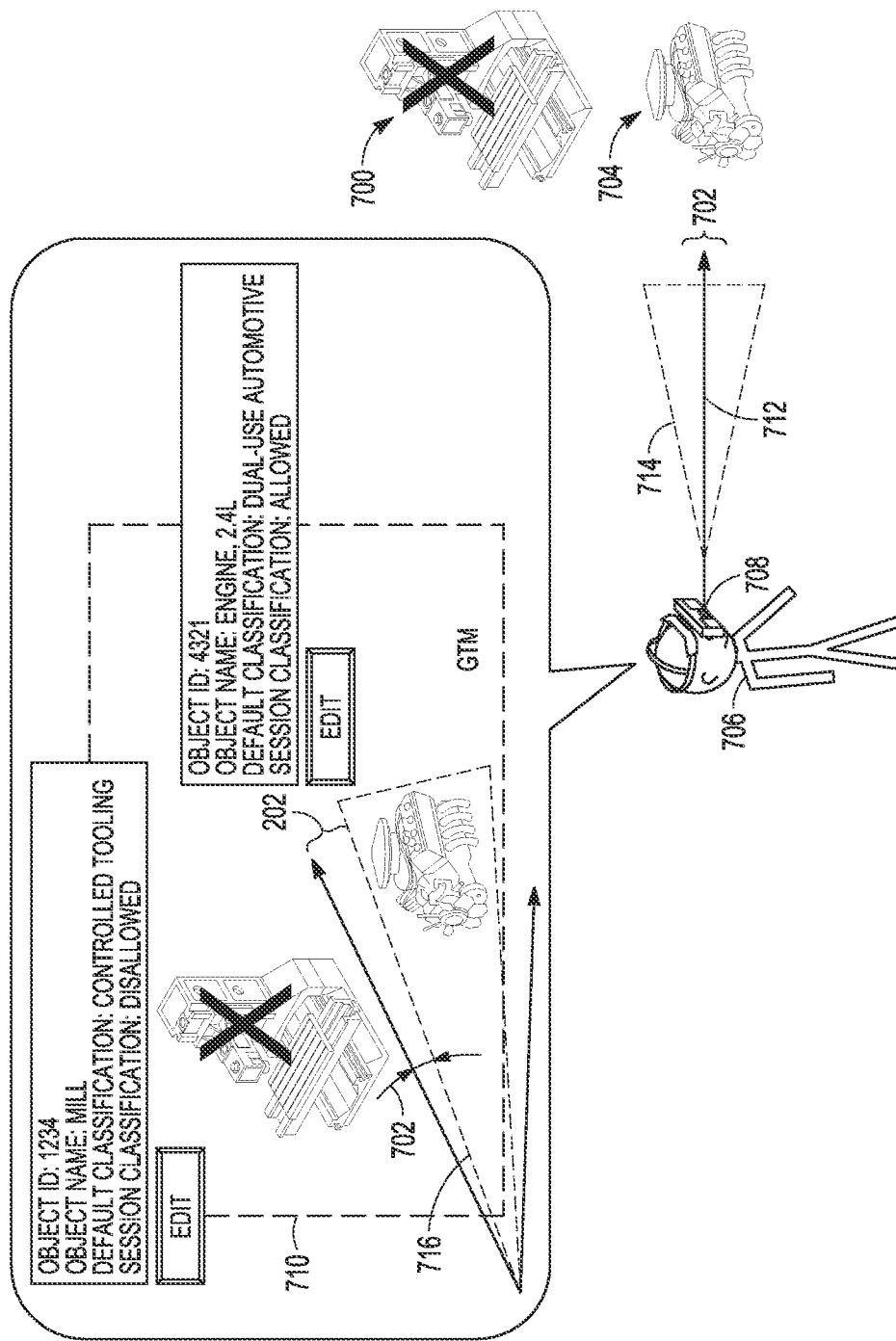
FIG. 5 is an illustration of using the GTM to enforce an alignment condition to a specified object in the scene to enforce data capture and transmission compliance.

Referring now to FIG. 5, an "Alignment Condition" technique ensures in real or near real-time that disallowed objects 700 are not included in the video stream by enforcing an alignment condition 702 to a specified allowed object 704. The alignment condition can be set to plus/minus a few degrees to ensure the technician 706 keeps his/her eyes on the specified object or the compliance processor, knowing the location of the technician (video camera 708) can determine from the final GTM 710 how much the technician's eyes (camera pointing direction 712) can wander from a specified object before a disallowed object will appear in the camera FOV (CFOV) 714. In the latter case, the alignment condition may change as the technician moves to perform a given task. The alignment condition can be enforced either by monitoring changes in the technician's pose (via the gyro) or by comparing a map FOV 716 for the current frame against final GTM 710. The interrupt processor may also generate cues that are displayed (or verbalized) to the technician. If the camera pointing direction 712 is pointing directly at allowable object 704 a green "good" might be provide. If the pointing direction 712 starts to wander but is still within the alignment condition 702 a yellow—correct right might be provided. If the pointing direction 712 violates the alignment condition 702 a red—camera deactivated might be provided and an interrupt issued to the video camera. Additional details for enforcement of alignment condition without a GTM are provided in U.S. Pat. Nos. 10,403,046 and 10,679,425.

Figure 6:
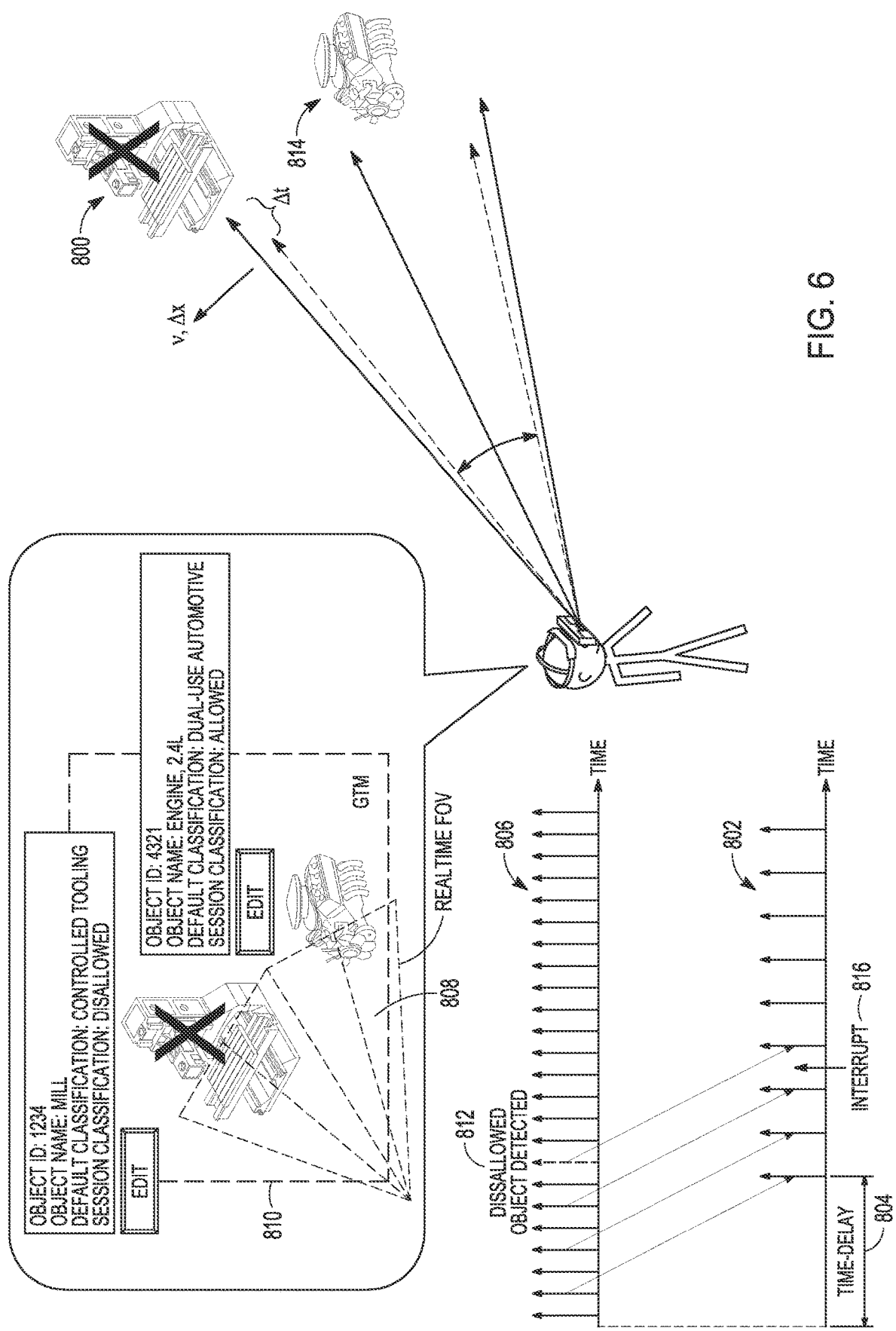
FIG. 6 is an illustration of using the GTM with time-delayed capture of the video signal to enforce data capture and transmission compliance.

Referring now to FIG. 6, a "Time-Delay" technique ensures in real or near real-time that disallowed objects 800 are not included in the video stream 802 by inserting a time-delay 804 into the sequence of images 806. The time-delay 804 must be long enough that a map FOV 808 (or pose) in a final GTM 810 can be processed to detect the presence of a disallowed object 812 (or to ensure an alignment condition is met to an allowed object 814) and issue an interrupt 816 before the problematic image is included in the video stream 802 and short enough that capture and transmission of the video stream 802 is still real or near real time. In another embodiment, a second sensor having a FOV that spans the entire CFOV can be used in conjunction with the final GTM to recognize objects and issue the interrupt. The interrupt processor may generate cues for the technician. Additional details for capture and transmission compliance using time-delay are providing in co-pending U.S. application Ser. No. 17/507,073 entitled "Time-Delay to Enforce Data Capture and Transmission Compliance in Real and Near Real Time Video" filed Oct. 21, 2021 and U.S. application Ser. No. 18/134,852 entitled "Single Camera Time-Delay to Enforce Data Transmission Compliance in Real and Near Real Time Video" filed Apr. 14, 2023.

Figure 7:
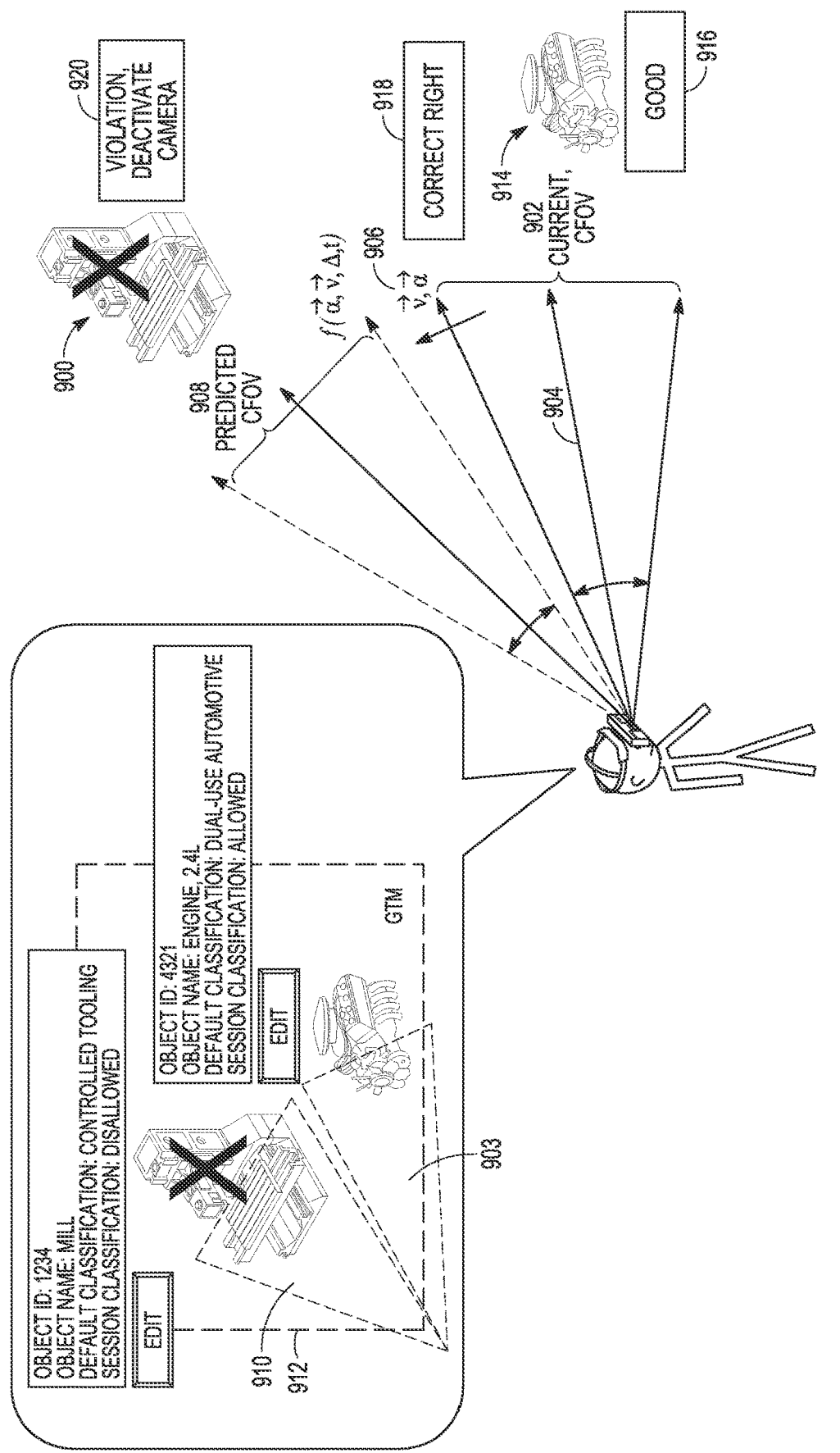
FIG. 7 is an illustration of using the GTM with a predictive FOV of the video signal to enforce data capture and transmission compliance.

Referring now to FIG. 7, a "Predictive FOV" technique ensures in real or near real-time that disallowed objects 900 are not included in the video stream by using a current CFOV 902 (map FOV 903) and camera pose 904 and measurements of camera velocity and acceleration 906 to compute predicted CFOV 908 and predicted map FOV 910 in the final GTM 912 for one or more future frames. The compliance processor determines whether any of the future frames contain a disallowed object 900 or fail to satisfy an alignment condition to an allowed object 914. The interrupt processor may also generate cues that are displayed (or verbalized) to the technician. If the camera pointing direction is pointing directly at allowable object 914 a green "good" 916 might be provide. If the pointing direction starts to wander in the predicted CFOV 908 but is still within the alignment condition a yellow—correct right 918 might be provided. If the pointing direction in the predicted CFOV 908 violates the alignment condition a red—deactivate camera 920 might be provided and an interrupt issued to the video camera. Additional details for capture and transmission compliance using time-delay are providing in co-pending U.S. application Ser. No. 17/507,073 entitled "Predictive Field-of-view (FOV) and Cueing to Enforce Data Capture and Transmission Compliance in Real and Near Real Time Video" filed Oct. 21, 2021.

It should be understood that each of the processors e.g., the GTM, interrupt processor and video processor may be implemented as a single or multiple processors. The single or multiple processors may be configured to perform individual or multiple tasks.

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

We claim:

1. A method of preventing transmission of excluded data in a local scene from a video signal, said method comprising:
   in a ground truth map (GTM) generation mode;
   using a sensor to capture images of the local scene and store as session data in session memory;
   processing the session data to generate a GTM of the local scene including one or more identified objects, said GTM including position or feature data of the identified objects;
   in a firewall mode;
   placing the GTM outside the session memory; and
   wiping all session data from session memory;
   in a video capture and transmission mode;
   using an end user device (EUD) with a video camera to capture a sequence of images within a camera field-of-view (CFOV) in a pointing direction in the local scene to form a video signal;
   prior to forming the video signal, accessing the GTM to determine whether the CFOV will include disallowed or allowed objects;
   if a disallowed object will be included in the CFOV, controlling the video camera or sequence of images to prevent inclusion of the disallowed object in the video signal; and
   if no disallowed objects will be included in the CFOV, forming and transmitting the video signal;
   wherein the GTM generation and firewall modes are implemented on a device that runs a non-persistent virtual machine (NPVM) that includes the session memory, further comprising:
   to initiate the GTM generation mode, starting the NPVM on the device; and
   in firewall mode, shutting down the NPVM to wipe all session data from session memory.

2. The method of claim 1, wherein the EUD's video camera is the sensor, and all modes are implemented on the EUD.

3. The method of claim 1, wherein the session data is processed by a device in a local network with the EUD to generate the GTM, wherein session data is wiped from session memory on the device.

4. The method of claim 3, wherein the EUD's video camera is the sensor and provides the images of the local scene via the local network to the device to generate the GTM.

5. The method of claim 3, wherein the sensor is separate from the EUD.

6. The method of claim 3, in the video capture and transmission mode, prior to forming the video signal, the device accesses the GTM to determine whether the CFOV includes a disallowed object and transmits an interrupt over the local network to the EUD to enable or disable the video camera or sequence of images to prevent inclusion of the disallowed object in the video signal.

7. The method of claim 3, in the video capture and transmission mode, prior to forming the video signal, the EUD accesses the GTM to determine whether the CFOV includes a disallowed object and controls the video camera or sequence of images to prevent inclusion of the disallowed object in the video signal.

8. The method of claim 1, wherein the GTM includes no imagery from the local scene.

9. The method of claim 8, wherein any disallowed objects in the GTM are not identified by specific name or type.

10. The method of claim 8, wherein the GTM includes one or more disallowed objects from the local scene, each disallowed object being characterized by one or more features and feature values, wherein in video capture and transmission mode candidate objects are extracted from the CFOV and compared to the feature values of the disallowed objects in the GTM.

11. The method of claim 8, wherein the GTM includes one or more disallowed objects from the local scene, each disallowed object being characterized by a position in the local scene.

12. The method of claim 11, wherein the position in the local scene constitutes a pose including the position in the local scene and a pointing direction of the EUD's video camera that would capture the disallowed object, wherein the step of accessing the GTM to determine whether the CFOV will include the disallowed object includes computing a current pose of the EUD's video camera and comparing it to the GTM.

13. The method of claim 1, wherein placing the GTM outside the session memory includes either directly placing the GTM in memory outside the session memory or moving the GTM from session memory prior to wiping session memory.

14. A method of preventing transmission of excluded data in a local scene from a video signal, said method comprising:
in a ground truth map (GTM) generation mode;
using a sensor to capture images of the local scene and store as session data in session memory;
processing the session data to generate a GTM of the local scene including one or more identified objects, said GTM including position or feature data of the identified objects;
in a firewall mode;
placing the GTM outside the session memory;
wiping all session data from session memory;
generating a confirmation that all session data has been wiped from session memory; and
inhibiting execution of a video capture and transmission mode until such confirmation is received;
in the video capture and transmission mode;
using an end user device (EUD) with a video camera to capture a sequence of images within a camera field-of-view (CFOV) in a pointing direction in the local scene to form a video signal;
prior to forming the video signal, accessing the GTM to determine whether the CFOV will include disallowed or allowed objects;
if a disallowed object will be included in the CFOV, controlling the video camera or sequence of images to prevent inclusion of the disallowed object in the video signal; and
if no disallowed objects will be included in the CFOV, forming and transmitting the video signal.

15. The method of claim 14, wherein inhibiting execution of video capture and transmission mode until such confirmation is received comprises at least one of:
at least temporarily deactivating the EUD's video camera;
deactivating a switch in the EUD to prevent the images that include the disallowed object from being transmitted;
deactivating processing the GTM; or
providing an encryption key to access the GTM.

16. A method of preventing transmission of excluded data in a local scene from a video signal, said method comprising:
providing an end user device (EUD) with a video camera having a camera field-of-view (CFOV) that runs a non-persistent virtual machine (NPVM) that includes the session memory;
in a ground truth map (GTM) generation mode;
starting the NPVM on the EUD to initialize session memory;
using a EUD's video camera to capture images of the local scene and store as session data in session memory;
processing the session data on the EUD to generate a GTM of the local scene including one or more identified objects, said GTM including position or feature data of the identified objects but no imagery of disallowed objects from the local scene;
in a firewall mode;
placing the GTM outside the session memory; and
shutting down the NPVM to wipe all session data from session memory and generate a confirmation message;
in a video capture and transmission mode;
in response to receipt of the confirmation message,
using the EUD's video camera to capture a sequence of images within the CFOV in a pointing direction in the local scene to form a video signal;
prior to forming the video signal, accessing the GTM to determine whether the CFOV will include disallowed or allowed objects;
if a disallowed object will be included in the CFOV, controlling the video camera or sequence of images to prevent inclusion of the disallowed object in the video signal; and
if no disallowed objects will be included in the CFOV, forming and transmitting the video signal.

17. A system of preventing transmission of excluded data in a local scene from a video signal, said system comprising:
a sensor to capture images of the local scene and store as session data in session memory;

one or more ground truth map (GTM) processors configured to process the session data to generate a GTM of the local scene including one or more identified objects, said GTM including position or feature data of the identified objects and then place the GTM outside the session memory and wipe all session data from session memory;

an end user device (EUD) including a video camera configured to capture a sequence of images within a camera field-of-view (CFOV) in a pointing direction in the local scene to form a video signal;

prior to forming the video signal, one or more compliance processors configured to access the GTM to determine whether the CFOV will include disallowed or allowed objects;

if a disallowed object will be included in the CFOV, one or more interrupt processors controlling the video camera or sequence of images to prevent inclusion of the disallowed object in the video signal; and if no disallowed objects will be included in the CFOV, a video processor and transmitter configured to form and transmit the video signal;

wherein the one or more GTM processors are configured to run a non-persistent virtual machine (NPVM) that includes the session memory, wherein the GTM processors are configured to shut down the NPVM is to wipe all session data from session memory.

18. The system of claim 17, wherein the EUD's video camera or compliance processors are inhibited from capturing and transmitting the video signal until a confirmation message is received that session memory has been wiped, wherein shutting down the NPVM generates the confirmation message.

* * * * *